Oct. 4, 1966 P. T. COLE ET AL 3,276,946

LOW FRICTION MAGNETIC RECORDING TAPE

Filed April 25, 1961 2 Sheets-Sheet 1

INVENTORS
PLEASANT T. COLE
JAMES E. KUPPERIAN, JR.

BY G. D. O'Brien
Richard J. Keegan
ATTORNEYS

LOW FRICTION MAGNETIC RECORDING TAPE

Filed April 25, 1961 2 Sheets-Sheet 2

INVENTORS
PLEASANT T. COLE
JAMES E. KUPPERIAN, JR.
BY
ATTORNEYS 3,276,946
Patented Oct. 4, 1966

3,276,946

LOW FRICTION MAGNETIC RECORDING TAPE

Pleasant T. Cole, Washington, D.C., and James E. Kuperian, Jr., East Riverdale, Md., assignors to the United States of America as represented by the Administrator of the National Aeronautics and Space Administration Filed Apr. 25, 1961, Ser. No. 105,518
1 Claim. (Cl. 161—189)

The invention described herein may be manufactured and used by or for the Government of the United States of America for governmental purposes without the payment of any royalties thereon or therefor.

The present invention relates to magnetic recording tape and more particularly to an improved low friction magnetic recording tape having characteristics of high fidelity and long wear.

Mechanical tape and wire recorders are enjoying a wide use in both commercial and domestic applications. The majority of these recorders utilize a long magnetic tape which is stored on a supply reel mounted on a deck of the recorder. The magnetic tape travels from the supply reel past the recording and/or play back transducer and is wound onto a take-up reel for storage after the information is either recorded or read from the magnetic tape. Recorders of this type require a great deal of manual manipulation for positioning both the supply and takeup reels and in threading the magnetic tape so that it will correctly travel between these two reels.

The application of magnetic recorders to store data measured and observed by experimental satellites or deep space probes is expected to increase manifold in the next few years. Because of the long transmission distances and the limited power available for transmission of this data, it is desirable to record the data as it occurs for later transmission to earthbound receiving stations. The nature of the vehicle containing these recorders not only requires that their operation be completely automatic but also places severe limitations on their size, weight, reliability and power consumption.

Recent developments in cartridge loaded recorders have permitted automatic or semiautomatic operation of magnetic tape recorders for domestic as well as space application. It has been found to be advantageous to utilize only a single reel in these cartridges which contains an endless loop of magnetic tape. The magnetic tape is mounted on the reel of the cartridge in the form of a spiral wound coil having concentric cylindrical convolutions. The tape is removed from the innermost convolution of the spiral coil, travels past the transducers of the recorder and is returned to the outermost convolution of the coil. The tape is then wound through the successive concentric cylindrical convolutions of the tape coil until it again becomes the innermost convolution on the reel. Endless loops of tape mounted as aforedescribed on a single reel have been adapted for use in conventional high fidelity recorders for maintaining orderly storage and smooth operation thereof.

Tape transporting means well known in the art, such as a driven capstan and idler roller, is used to pull the innermost convolution of the tape from the reel at a substantially constant linear speed. This pulling action, on the innermost convolution of the tape, causes sliding between adjacent convolutions of the tape coil as the tape advances on the reel. The friction produced between the adjacent convolutions of the endless tape coil produces a drag on the tape which rotates the reel so that the endless tape will be fed to as well as from the reel. Additional drive means may be provided to help rotate the reel when extremely large reels are used.

Accuracy in recording fidelity demands that distortion, such as "wow," or variations of the speed of the magnetic carrier be reduced to a minimum. One difficulty in using endless loop tapes mounted in a spiral form on a reel has been that the friction that is normally produced between successive convolutions of the endless tape causes uneven tension and hence variations in the draw or drag of the tape as it is pulled from the reel. The uneven tension results in variations in the speed of the tape which introduces inaccuracies and loss of recording fidelity.

Heretofore, graphite has been applied to one surface of the magnetic tape as a lubricant for the tape to reduce the friction between adjacent convolutions and to obtain a uniform drag as the tape is removed from a storage reel. The graphite has been sprinkled or coated on the tape in the form of a thin film deposited by various carrier fluids. Graphite coatings, however, have proven unsatisfactory especially for satellite use since, regardless of how the coating has been bonded to the tape, the graphite has eventually rubbed off with use producing large increases in the friction of the tape and uneven tension as the tape is drawn from the reel. These factors result in increased loading on the tape transport causing speed instability and, consequently, deterioration of the recording quality. In addition, it has been found that the accumulation of the graphite rubbed off from the tape damages or at least coats the recording and/or play back transducers of the recorder to further diminish the recording quality. These problems are extremely serious in space data recording, as the inaccessibility of the recording mechanism for maintenance when the friction has become sufficiently high causes the recorder to jam, stopping its operation.

The general purpose of the present invention is to provide an improved magnetic tape construction which embraces all the advantages of similarly employed magnetic tapes and possesses none of the aforedescribed disadvantages. To obtain this, the invention contemplates utilizing the superior dry lubricating characteristics of a fluorocarbon plastic as an antifriction agent to provide a nondeteriorating lubricant for high fidelity recording tapes.

An object of the present invention is to provide a magnetic tape which operates efficiently without maintenance over long periods of time with a minimum amount of surface friction and without the resulting deterioration of recording fidelity.

A further object of the invention is to provide an improved low friction magnetic recording tape especially suitabe as an endless magnetic tape for use with single reel recording devices.

Another object of the instant invention is the provision of an improved magnetic recording tape, the prolonged use of which will not damage the transducer elements of a tape recorder.

Another object of this invention is to provide an improved extremely reliable magnetic recording carrier especially suitable for applications where maintenance is impracticable, such as, for example, in space experiments.

Other objects and advantages of the invention will hereinafter become more fully apparent from the following description of the annexed drawings, which illustrate a preferred embodiment, and wherein.

Figure 1:
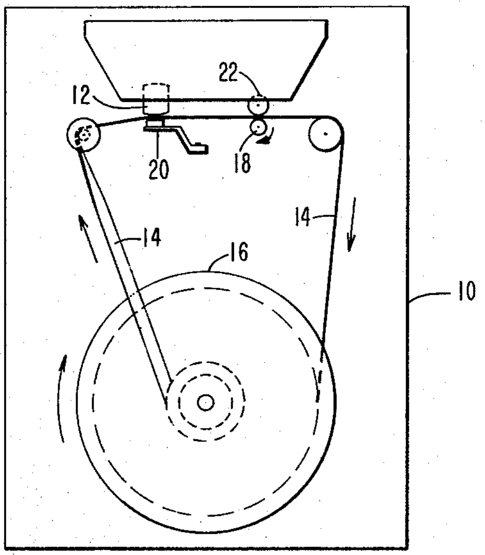
FIG. 1 is a diagrammatic plan view of a typical loop type recorder device to which the invention is particularly adaptable.

Referring now to FIG. 1, the recording device generally indicated at 10 has mounted on the upper deck thereof recording and/or playback transducer 12 engaging an endless magnetic recording tape 14. The tape 14 is arranged to form convolutions upon itself within reel 16 as will be further described hereinafter. A suitable motor (not shown) drives capstan 18 which with idler roller 22 moves the magnetic tape past the transducer 12 so that informational items can be recorded on the magnetic tape or read out therefrom in a conventional fashion. Data may be stored on the tape and when desired, as for example, on receipt of a command signal, the transducer 12 is activated to extract the recorded information from the magnetic tape. A pressure pad 20 is provided to position the magnetic tape relative to the transducer head 12. The single transducer 12 may be used to either record or play back recorded information as is well known in the art, or additional transducers may be provided, such as, separate record and read out heads and an erase head.

In operation, the driven capstant 18 and idler roller 22 frictionally engage the tape 14 to pull the innermost convolution of the tape from reel 16 past the recording/playback transducer 12. The drag or draw of the tape causes reel 16 to rotate and to rewind the tape in a spiral fashion back on the reel. The tape is continuously pulled from the rotating reel in this manner and advances through the successive convolutions of the coil until it again becomes the innermost convolution on the reel.

Figure 2:
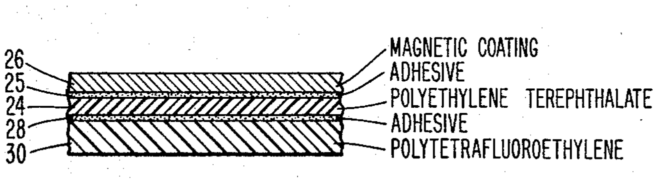
FIG. 2 represents a cross sectional view of one embodiment of the instant invention.

In FIG. 2 there is illustrated an embodiment of the present invention which consists of a flexible nonmagnetic base or ribbon 24 which has attached to one surface thereof a magnetic material 26, such as iron oxide particles or the like. The magnetic particles may be bonded or adherently attached by an adhesive 25 to one side of the ribbon 24 in any suitable manner as, for example, described in U.S. Patent No. 2,607,710, issued on August 19, 1952. The ribbon may consist of cellulose nitrate, cellulose acetate, cellulose butyrate, polyvinyl chloride or the like. On the opposite surface of the ribbon there is bonded by an adhesive 28, or otherwise suitably attached, an inert plastic variously known as fluorothenes, fluorocarbons and fluorochemical plastics in the form of a film 30 to provide a continuous uniform lubricant backing for the ribbon.

For high fidelity application, such as required by space experiments, the ribbon 24 of the preferred embodiment comprises a strip of polyethylene terephthalate, sold under the trademark Mylar, which is oriented by stretching in two substantially perpendicular directions and has molecular weight sufficiently high to show a characteristic crystal X-ray diffraction pattern when stretched. The Mylar ribbon or base may be, for example, one quarter of an inch wide and 0.5 mil thick with a magnetic coating of an iron oxide compound 0.5 mil thick adherently bonded to one side of the Mylar ribbon. The lubricant film comprises a 1.0 mil film of polyetetrafluoroethylene presently sold under the trademark Teflon. Somewhat thicker or thinner Teflon lubricant films may be used if desired. However, the 1.0 mil thickness will provide satisfactory results.

In the past, the process of bonding certain synthetic resins having a high fluorine content, such as polytetrafluorethylene (Teflon), to itself or to other materials has presented many problems. These problems arise since the aforementioned resins have a relatively low coefficient of friction, high thermal stability and high resistance to wetting by water, cements, adhesive and solvents. Processes and cements have been developed to adhere a film of fluorine containing synthetic resin to itself or to other materials which include treatment of the surface of these synthetic resins before the adhesive or cement is applied. The U.S. Patent Nos. 2,809,130, issued on October 8, 1957, to G. Rappaport; 2,824,026, issued on February 8, 1958, to H. N. Homeyer et al; and 2,945,773, issued on July 9, 1960, to A. Panagrossi et al., disclose processes and adhesives for bonding fluorine containing synthetic resins wherein the surface of the resin is treated before the bonding adhesive is applied. The process and adhesives disclosed in these patents may be adapted to form the bond between the polyethylene terephthalate and the polytetrafluoroethylene in the laminate of FIG. 2.

A variety of other processes and adhesives are also available which may be used to form the bond between the Teflon and Mylar of the improved magnetic tape disclosed herein. Some of these adhesives are more readily adapted in the bonding process for making the laminate of the preferred embodiment of the instant invention as they do not require pretreatment of the surface of the polytetrafluorothylene film. One such suitable adhesive is a modified polyester cement with cross linking agents, such as Du Pont Cement No. 46960.

Figure 3:
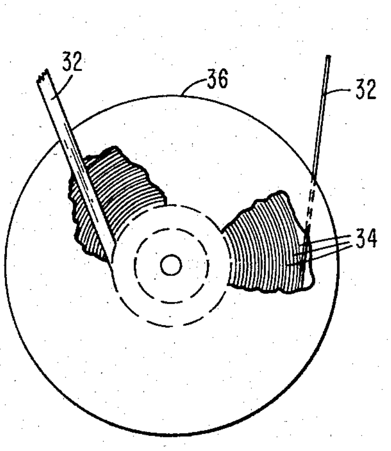
FIG. 3 is a broken away perspective view of a magnetic tape reel illustrating the reduced friction obtainable from practicing of the instant invention.

In FIG. 3 the spiral convolutions of the improved tape 32 can be seen arranged on reel 36 with one portion of the tape leading away from the innermost convolution toward the transducer and another portion returning from the transducer to become the outermost convolution. It will be noted that each convolution 34 of the endless tape rubs against the two adjacent convolutions in proceeding along its route through the reel 36.

Figure 4:
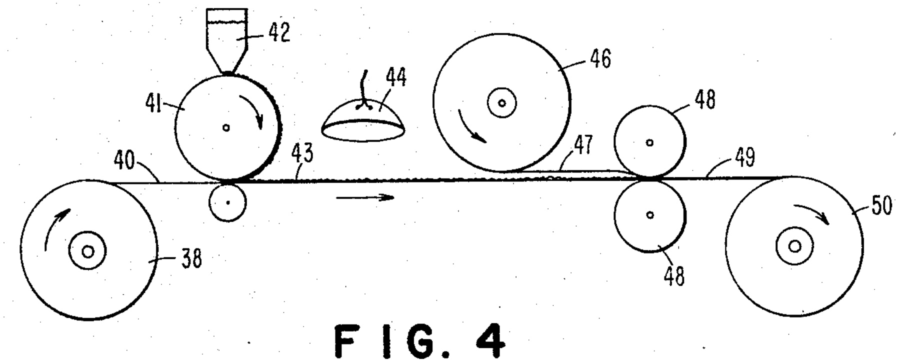
FIG. 4 is a diagrammatic view in elevation illustrating one suitable process for bonding the lubricant material to the magnetic recording carrier.

By means of the fluorocarbon plastic or Teflon backing 30 of the nonmagnetic surface of the tape ribbon 24, a permanent, continuous, nondeteriorating lubricating surface is provided which sufficiently lubricates the adjacent convolutions of the tape to permit a low uniform drag as the tape is removed from and wound onto the reel. Thus, the speed irregularity so detrimental to high fidelity recording is eliminated. In addition, as the Teflon backing is permanently bonded to the tape ribbon 24, as by adhesive or other suitable means, no accumulation of harmful deposits of this lubricating element will contaminate the transducers of the recorder mechanisms. The end result is a higher quality recording for much greater lengths of time, than is possible with conventionally lubricated magnetic recording tapes., One suitable process for binding a Teflon film to the magnetic carrier Mylar ribbon is depicted in FIG. 4. A sheet or strip 40 of Mylar having a uniform width and thickness is drawn from a supply roll 38. A storage container 42 supplies an adhesive 43, such as the aforementioned Du Pont Cement No. 46960, in a low viscosity liquid form to roller 41. The adhesive 43 is rolled onto the ribbon 40 and is dried as it moves past a heat lamp 44. A supply roll 46 provides a strip or film of Teflon 47, having a uniform thickness and of approximately the same width as the Mylar strip 40, to the adhesively coated surface of the Mylar strip 40. The Teflon film 47 is applied in an aligned manner over the adhesive layer and is firmly secured to this surface of the Mylar strip by pressure rollers 48 to form a lubricant coating for a surface of the Mylar strip. The Mylar-Teflon laminate 49 is then stored by the supply roll 50. Suitable drive means are provided for rotating each of the rollers and supply rolls as required. Instead of storing the laminate 49 as shown in FIG. 4, the process may include all the steps necessary to adhere the magnetic coating to the Mylar surface of the laminate 49 before the laminate is stored. Any one of a number of well known processes for applying a magnetic coating to the surface of a magnetic carrier ribbon may be used herein to provide the magnetic coating for the Mylar surface of the laminate 49.

Processes, other than the aforedescribed, may be utilized to construct the laminate of FIG. 2. Such processes may be of the type wherein a fluorine containing synthetic resin which has the necessary lubricating properties is applied as a coating to a magnetic ribbon or carrier to form a lubricant backing for the ribbon. The process described by FIG. 4 is merely illustrative of a method which has been used successfully to provide a Teflon backing for the Mylar carrier used in the construction of the preferred embodiment of this invention.

To further reduce the frictional problem that is associated with an endless tape single reel recorder, the magnetic coating applied to the ribbon or base may be of a type that is used with high quality digital or video magnetic tape recorders. These magnetic coatings present a fairly hard surface and lower coefficient of friction than that usually found in audio tapes. An example of such a magnetic coating is described in U.S. Patent No. 2,819,186, issued to Ernest W. Franck on January 7, 1958. The use of this type of magnetic coating will further reduce the frictional drag of the magnetic tape and produce a more uniform draw as the tape is wound onto and unwound from the single storage reel of the recorder.

Various modifications are contemplated and may obviously be resorted to by those skilled in the art without departing from the spirit and scope of the invention, as hereinafter defined by appendant claim, as only a preferred embodiment thereof has been disclosed.

What is claimed is:

A low friction magnetic recording tape for use in an orbiting space vehicle provided with an endless loop magnetic tape recording mechanism comprising:

a ribbon tape of polyethylene terephthalate, said tape being 0.5 mil thick, a magnetic coating of iron oxide compound bonded to one surface of said tape, said coating having a thickness of 0.5 mil, a continuous film of polytetrafluoroethylene bonded to the other surface of said tape, said film having a uniform thickness of 1.0 mil, whereby adjacent convolutions of said tape are separated from each other by a lubricating film to reduce friction in tape feed and thereby permit prolonged use without maintenance.

References Cited by the Examiner

UNITED STATES PATENTS

| | | | |
|---|---|---|---|
| 2,778,637 | 1/1957 | Eash. | |
| 2,804,401 | 8/1957 | Cousin. | |
| 2,809,130 | 10/1957 | Rappaport. | |
| 2,862,845 | 12/1958 | Szegvari | 154—53.6 |
| 2,975,484 | 3/1961 | Amborski. | |
| 2,998,840 | 9/1961 | Davis. | |
| 3,030,248 | 4/1962 | Runton | 154—43 |

FOREIGN PATENTS

| | | |
|---|---|---|
| 556,760 | 4/1958 | Canada. |

EARL M. BERGERT, *Primary Examiner.*

J. P. MELOCHE, *Assistant Examiner.*